United States Patent
Chapelle (10) Patent No.: US 7,895,198 B2
(45) Date of Patent: Feb. 22, 2011

(54) GRADIENT BASED OPTIMIZATION OF A RANKING MEASURE

(75) Inventor: Olivier Chapelle, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 432 days.

(21) Appl. No.: 11/863,453

(22) Filed: Sep. 28, 2007

(65) Prior Publication Data

US 2009/0089274 A1   Apr. 2, 2009

(51) Int. Cl.
G06F 17/30 (2006.01)
G06F 7/00 (2006.01)
(52) U.S. Cl. .................. 707/728; 707/731; 707/748
(58) Field of Classification Search .................. None
See application file for complete search history.

(56) References Cited

U.S. PATENT DOCUMENTS

| | | | |
|---|---|---|---|
| 7,197,497 B2* | 3/2007 | Cossock | 707/7 |
| 7,593,934 B2* | 9/2009 | Li et al. | 707/5 |
| 2007/0094171 A1* | 4/2007 | Burges et al. | 706/16 |

OTHER PUBLICATIONS

Le, Quoc V., et al. "Direct Optimization of Ranking Measures", Apr. 25, 2007, pp. 1-25.*
Friedman, Jerome H. "Greedy Function Approximation: A Gradient Boosting Machine", The Annals of Statistics, 2001, vol. 29, No. 5, 1189-1232, pp. 1-44.*
Le, Quoc V., et al., "Direct Optimization of Ranking Measures", arXiv:0704.3359v1 [cs.IR], (Apr. 25, 2007), 25 pages.
Burges, Christopher J., et al., "Learning to Rank with Nonsmooth Cost Functions", Neural Information Processing Systems Conference, Vancouver, B.C., (2006), 8 pages.
"What is overfitting and how can I avoid it?", Part 3 of 7 of a posting to Usenet newsgroup comp.ai.neural-nets, Copyright 2002 by Warren S. Sarle, Cary, North Carolina; http://www.faqs.org/faqs/ai-faq/neural-nets/part3/section-3.html, (2002), 3 pages.

* cited by examiner

Primary Examiner—Jay A Morrison
Assistant Examiner—Sangwoo Ahn
(74) Attorney, Agent, or Firm—Fiala & Weaver P.L.L.C.

(57) ABSTRACT

Methods, systems, and apparatuses for generating relevance functions for ranking documents obtained in searches are provided. One or more features to be used as predictor variables in the construction of a relevance function are determined. The relevance function is parameterized by one or more coefficients. A query error is defined that measures a difference between a relevance ranking generated by the relevance function and a training set relevance ranking based on a query and a set of scored documents associated with the query. The query error is a continuous function of the coefficients and aims at approximating errors measures commonly used in Information Retrieval. Values for the coefficients of the relevance function are determined that substantially minimize an objective function that depends on the defined query error.

25 Claims, 7 Drawing Sheets

GRADIENT BASED OPTIMIZATION OF A RANKING MEASURE

BACKGROUND OF THE INVENTION

1. Field of the Invention

The present invention relates to improved ranking of search results.

2. Background Art

A search engine is an information retrieval system used to locate documents and other information stored on a computer system. Search engines are useful at reducing an amount of time required to find information. One well known type of search engine is a Web search engine which searches for documents, such as web pages, on the "World Wide Web." The World Wide Web is formed by all publicly accessible websites, which primarily includes websites hosted on computer systems that are accessible over the Internet. Other types of search engines include personal search engines, mobile search engines, and enterprise search engines that search on intranets.

Development of a search engine that can index a large and diverse collection of documents, yet return to a user a short, relevant list of result documents in response to a query has long been recognized to be a difficult problem. A user of a search engine typically supplies a short query to the search engine, the query containing only a few terms, such as "hazardous waste" or "country music." The search engine attempts to return a list of relevant documents. Although the search engine may return a list of tens or hundreds of documents, most users are likely to only view the top few documents on the list. Thus, to be useful to a user, a search engine is desired to be able to determine, from potentially billions of documents, the two or three documents that a user would be most interested in, according to the query submitted by the user.

Previously, search engine designers have attempted to construct relevance functions that take a query and a document as their input and return a relevance value. Relevance values may be used, for example, to create a list of documents indexed by the search engine. The list ranks the documents in order of relevance to the query. For the top two or three documents on this list to be useful to a user, the underlying relevance function must be able to accurately and quickly determine the relevance of a given document to a query.

A user's perception of true relevance of a document to a query is influenced by a number of factors, many of which are highly subjective. A user's preferences are generally difficult to capture in an algorithmic set of rules defining a relevance function. Furthermore, these subjective factors may change over time, such as when current events are associated with a particular query term. Changes over time in the aggregate content of the documents available in the Internet may also alter a user's perception of the relative relevance of a given document to a particular query. A user who receives a return list from a search engine that contains documents that the user does not perceive to be highly relevant may become frustrated, and may potentially abandon the use of that particular search engine.

Thus, what is needed are techniques for determining a document relevance function that reflects one or more human users' perceptions of document relevance to a query, and can rank documents quickly and efficiently.

BRIEF SUMMARY OF THE INVENTION

Methods, systems, and apparatuses for generating relevance functions are provided. The generated relevance functions may be used to rank documents obtained in searches based on queries having one or more search terms. The searches may be performed in any medium, including on a computer system, on an intranet, and/or on the World Wide Web.

In a first example, one or more features to be used as predictor variables in the construction of a relevance function are determined. The relevance function is parameterized by one or more coefficients. A query error is defined that measures a difference between a relevance ranking generated by the relevance function and a training set relevance ranking based on a query and a scored set of documents. Values for the coefficients of the relevance function are determined that substantially minimize an objective function that depends on the defined query error. In some examples, the objective function may be a sum over a set of queries of the defined query error, a weighted sum over the set of queries of the defined query error, or a regularized sum over the set of queries of the defined query error.

In an aspect of the present invention, the query error, as defined herein, is a smooth continuous approximation of an ideal query error. For a provided relevance measure, such as the Discounted Cumulative Gain (DCG), the ideal query error is defined as the difference between the best possible value of the relevance measure and the value corresponding to the ranking induced by the relevance function. Because the ideal query error depends on a sorting operation, the ideal query error is not continuous. Therefore, it is conventionally difficult to find the coefficients of the ranking function which minimize the sum of the query errors. In an aspect of the present invention, the smooth continuous approximation of the ideal query error can be optimized efficiently by gradient descent.

In a further aspect, the relevance function having the determined values for the one or more coefficients may be tested. If the relevance function does not satisfy the testing, one or more coefficients of the relevance function may be adjusted, other parameters may be adjusted, and the determination of values for the coefficients of the relevance function may be repeated.

In another example, a system for determining a relevance function is provided. The system includes a relevance function constructor and a relevance function tuner. The relevance function constructor is configured to construct a relevance function based on one or more features used as predictor variables and one or more coefficients. The relevance function tuner is configured to determine values for the one or more coefficients of the relevance function to substantially minimize an objective function over a set or queries for a query error.

In a further aspect, the system for determining a relevance function may include a relevance function tester configured to test the relevance function having the values for the one or more coefficients determined by the relevance function tuner.

These and other objects, advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the present invention provide methods and systems for determining relevance functions. The determined relevance functions may be used to determine the relevance of documents returned from searches based on queries, in any type of search environment. For illustrative purposes, embodiments are described below in the context of web-based document searches performed by search engines. However, embodiments of the present invention are not limited to such web-based searches, and are also applicable to other types of searches, and to searches performed in other environments, including searches performed on a single computer system, searches performed on an intranet, and searches performed in other environments.

Embodiments overcome problems that exist in conventional document searching and ranking systems. The quality of a web search ranking is frequently measured through complex relevance measures/scores, such as the Discounted Cumulative Gain (DCG). One representation of the DCG (the DCG at rank p) is shown as follows, as Equation 1:

$$\frac{1}{n_q}\sum_{q=1}^{n_q}\sum_{j \in U_q} G(y_j)D(r(x_j)) \quad \text{Equation 1}$$

where $n_q$=a number of queries,

Uq=the set of documents retrieved for the query q, $y_j$=a training relevance grade for document j, such as a value selected from the set {0, 1, 2, 3, 4} by a human editor, $G(y_j)$=a mapping function for y, such as $$G(y)=2^y-1,$$

$$D(r) = \frac{1}{\log_2(r+1)}$$

if r is less or equal to p; 0 otherwise, $x_j$=a feature vector containing evaluated feature information for document j and the query, and $r(x_j)$=the relevance ranking function evaluated on a feature vector $x_j$.

The DCG is intended to allow for multi-levels of relevance, where each document contributes some "gain" corresponding to the level of relevance. The term "cumulative" in "DCG" refers to measuring the overall utility of n documents by the sum of the gain of each relevant document. The term "discounted" in "DCG" refers to discounting the gain of a document ranked low so that a highly ranked document will count more toward the gain. Alternatively, one can use the "normalized" DCG (NCDG) which is equal to the DCG divided by the best achievable value of the DCG.

Machine learning algorithms aim to optimize the DCG quantity, but have difficulty in doing so because it is not continuous (e.g., the DCG depends on the result of the ranking itself). Thus, standard optimization techniques cannot be used. This problem is more fully described in C. J. C. Burges, R. Ragno and Q. V. Le, "Learning to Rank with Non-Smooth Cost Functions", Neural Information Processing Systems (NIPS) Conference, Dec. 4, 2006, which is incorporated by reference herein in its entirety.

A conventional optimization technique for maximizing the DCG is to use a non-continuous optimization algorithm such as the Nealder-Mead simplex algorithm. However, this technique works only for a limited number of variables.

Embodiments of the present invention provide advantages over prior techniques. Embodiments enable learning of a relatively large number of coefficients/parameters of a new ranking model. Embodiments provide an advantage in optimizing the quantity of interest (DCG) over a large number of variables, which can lead to a significant increase in ranking performance.

Example Embodiments

The example embodiments described herein are provided for illustrative purposes, and are not limiting. Further structural and operational embodiments, including modifications/alterations, will become apparent to persons skilled in the relevant art(s) from the teachings herein.

Figure 1:
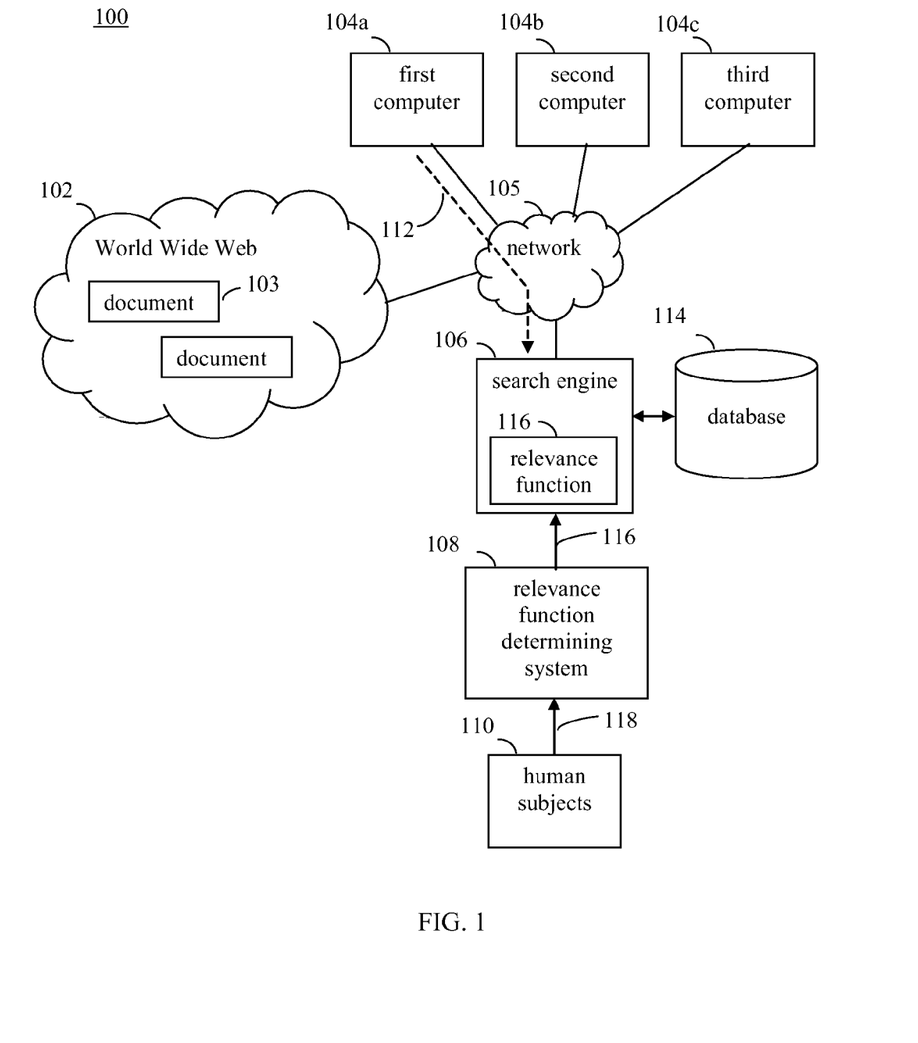
FIG. 1 shows a document retrieval system, according to an example embodiment of the present invention.

FIG. 1 shows a document retrieval system 100, according to an example embodiment of the present invention. System 100 includes a search engine 106, a relevance function determining system 108, and a database 114. In system 100, one or more computers 104, such as first-third computers 104a-104c, are connected to a communication network 105. Network 105 may be any type of communication network, such as a local area network (LAN) or a wide area network (WAN), or combination of communication networks. In embodiments, network 105 may include the Internet and/or an intranet. Computers 104 can retrieve documents from entities over network 105. In embodiments where network 105 includes the Internet, a collection of documents, including a document 103, which form a portion of World Wide Web 102, are available for retrieval by computers 104 through network 105. On the Internet, documents may be located by a uniform resource locator (URL), such as http://www.av.com, and/or by other mechanisms. Computers 104 can access document 103 through network 105 by supplying a URL corresponding to document 103 to a document server (not shown in FIG. 1).

As shown in FIG. 1, search engine 106 is coupled to network 105. Search engine 106 typically is coupled to a database 114 that indexes documents, such as documents of World Wide Web 102. A user of computer 104a that desires to retrieve a document relevant to a particular topic, but does not know the URL of such a document, may submit a query 112 to search engine 106 through network 105. Search engine 106 receives query 112, and analyzes database 114 to find documents relevant to query 112. For example, search engine 106 may determine a set of documents indexed by database 114 that include terms of query 112. The set of documents may include any number of documents, including tens, hundreds, thousands, or even millions of documents. Search engine 106 may use a ranking or relevance function 116 to rank documents of the retrieved set of documents in an order of relevance to the user. Documents of the set determined to likely be most relevant by relevance function 116 may be provided at the top of a list of the returned documents in an attempt to avoid the user having to analyze the entire set of documents.

Search engine 106 may be implemented in hardware, software, firmware, or any combination thereof. For example, search engine 106 may include software/firmware that executes in one or more processors of one or more computer systems, such as one or more servers. Examples of search engine 106 that are accessible through network 105 include, but are not limited to, Yahoo! Search™ (at http://www.yahoo.com), Ask.com™ (at http://www.ask.com), and Google™ (at http://www.google.com).

As shown in FIG. 1, relevance function determining system 108 is coupled to search engine 106. In embodiments, relevance function determining system 108 is used to generate relevance function 116 used by search engine 106. Relevance function determining system 108 determines relevance function 116, and transmits relevance function 116 to search engine 106. Relevance function 116 is a learning architecture with associated coefficients. Relevance function determining system 108 selects values for the coefficients to minimize a query error, thereby generating relevance function 116.

Relevance function determining system 108 may optionally be coupled to network 105. Relevance function determining system 108 may be implemented in hardware, software, firmware, or any combination thereof. For example, relevance function determining system 108 may include software/firmware that executes in one or more processors of one or more computer systems, such as one or more servers. In embodiments, relevance function determining system 108 may be implemented in a different, or in the same computer system(s) that implement search engine 106. When implemented in different computer systems, relevance function determining system 108 may communicate with search engine 106 via any suitable communication link, including network 105 or other network or communication link.

In embodiments, to generate relevance function 116, one or more training queries are used to generate one or more corresponding sets of documents. In one example, the plurality of training queries are determined, at least in part, based on logs of queries submitted by users of computers 104 to search engine 106. In an embodiment, the resulting sets of documents may be generated by submitting the training queries to one or more search engines 106 and receiving a response, typically a list of URLs, therefrom.

Relevance function determining system 108 receives the training queries and corresponding sets of documents. Relevance function determining system 108 additionally receives training information 118 from one or more human subjects 110. For example, human subjects 110 may be used to provide a set of training relevance scores for the documents in the result sets relative to their respective training queries. Based on the training queries, the documents in the result sets, and the training relevance scores, relevance function determining system 108 generates relevance function 116.

Figure 2:
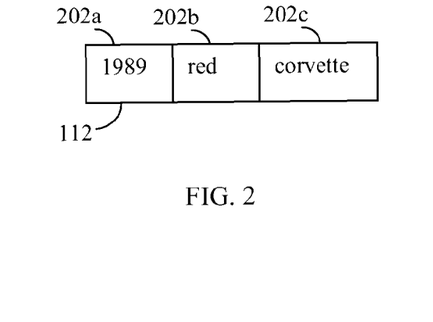
FIG. 2 shows an example query.
Figure 3:
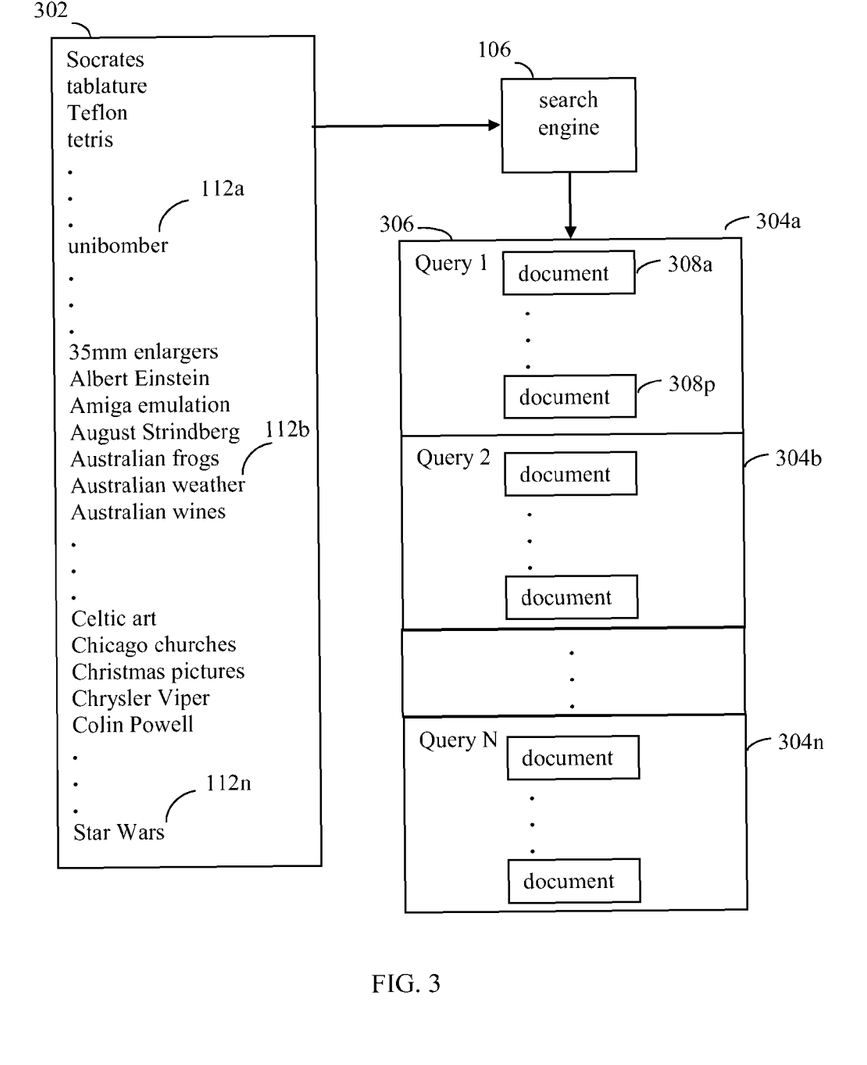
FIG. 3 shows a plurality of example training queries submitted to one or more search engines to generate resulting sets of documents.

FIG. 2 shows an example query 112 that may be submitted by a user of one of computers 104a-104c of FIG. 1. Query 112 includes one or more terms 202, such as first, second, and third terms 202a-202c shown in FIG. 2. Any number of terms 202 may be present in a query. FIG. 3 shows a plurality 302 of training queries that includes example queries 112a ("unibomber"), 112b ("Australian weather"), and 112c ("Star Wars"). FIG. 3 also shows a plurality 306 of result sets 304a-304n corresponding to training queries 112a-112n of plurality 302. In an embodiment, each training query 112 of plurality 302 is submitted to one or more search engines 106 to generate a respective result set 304. For example, FIG. 3 shows a Query 1 having a result set 304a containing documents 308a-308p. Each document in a result set 304 typically contains one or more of the terms in the respective training query 112.

Figure 4:
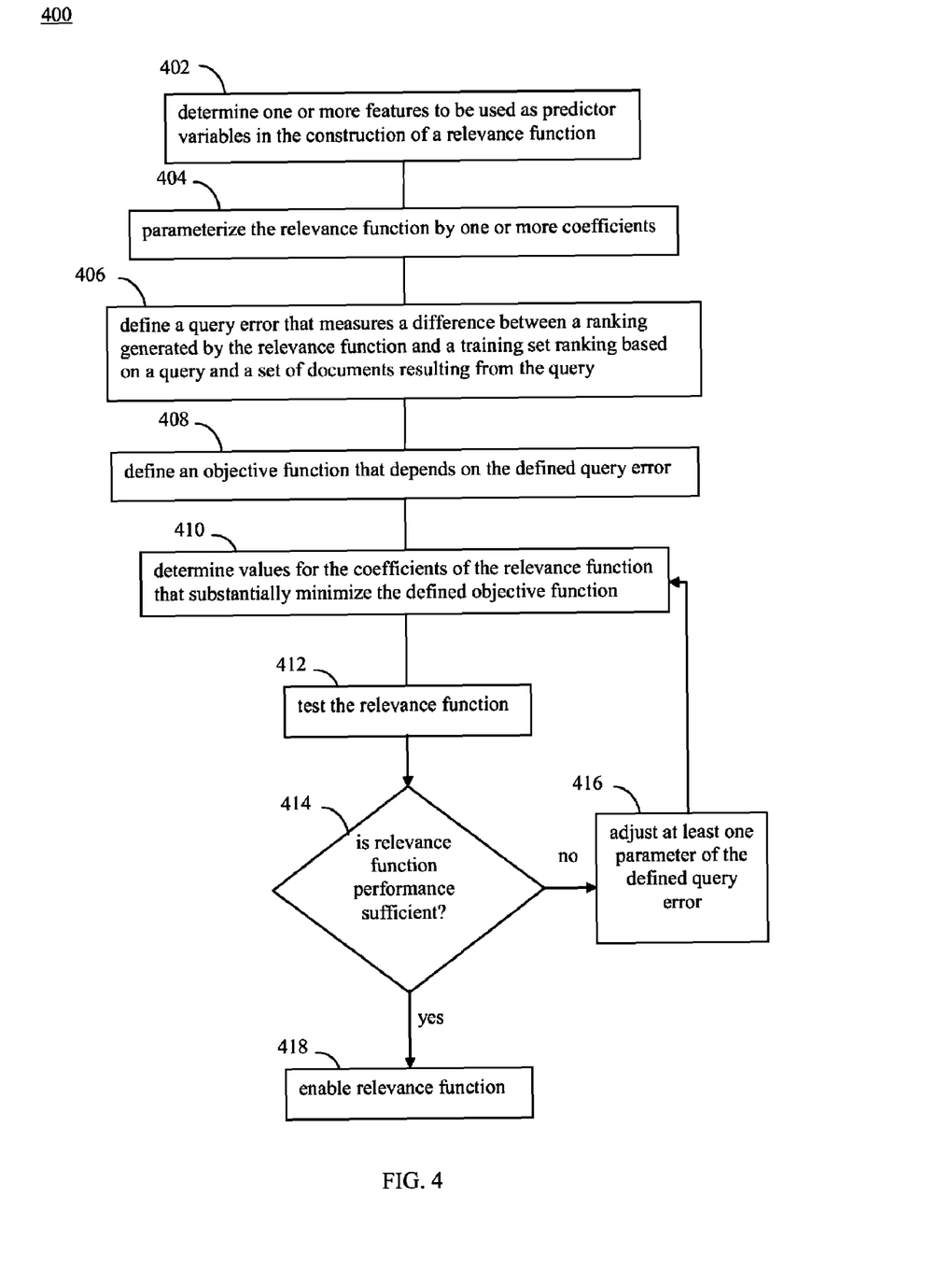
FIG. 4 shows a flowchart for determining a relevance function, according to an example embodiment of the present invention.

FIG. 4 shows a flowchart 400 for determining a relevance function, according to an example embodiment of the present invention. The steps of flowchart 400 do not necessary occur in the order shown in FIG. 4, in all embodiments. Furthermore, not all steps of flowchart 400 need to be performed in all embodiments. Further structural and operational embodiments will be apparent to persons skilled in the relevant art(s) based on the discussion regarding flowchart 400. Flowchart 400 is described as follows.

Flowchart 400 begins with step 402. In step 402, one or more features to be used as predictor variables in the construction of a relevance function are determined. "Feature," as used herein, is a term used to quantify an aspect of the relationship of a query to a document, or of an aspect of the document itself. With a document as input, and possibly a query, a feature returns a value. Features that return a value based only the contents of a document itself are referred to as query-independent features. Query-independent features may depend on properties of the document itself. Additionally, query-independent features may depend on properties of the server on which the document is located, and possibly properties of the relationship of the server to other servers on the Web. Features that require both a document and a query to return one or more values are referred to as query-dependent features. Throughout this document, the ith feature selected to relate a document to a query is denoted $x_i$. The set of features selected, including one or more individual features are, for notational convenience, denoted x, where $x=\{x_1, x_2, \ldots, x_d\}$, and d is the number of features so selected.

Any type of feature may be used as a predictor variable in embodiments of the present invention. For examples of query-independent and query dependent features applicable to embodiments of the present invention, refer to U.S. Pat. No. 7,197,497 to David Cossack, titled "Method and Apparatus for Machine Learning a Document Relevance Function," which is incorporated by reference herein in its entirety.

Referring to FIG. 4, in step 404, the relevance function is parameterized by one or more associated coefficients. These coefficients are encoded in a vector w. For example, in an embodiment, relevance function 116 is initially generated as a combination of one or more base functions that incorporate one or more features, and associated coefficients. In an example embodiment, the initial relevance function may be parameterized as a linear function of features, such as:

$$f(x, w) = \sum_{i=1}^{d} x_i w_i \qquad \text{Equation 2}$$

where f(x,w)=the relevance function, x=a feature vector representing a (query, document) pair, w=is a vector of coefficients, and d=a number of coefficients and features.

In another embodiment, the parameterization of the relevance function may involve more complex functions of the features, such as:

$$f(x, w) = \sum_{i=1}^{d} w_i a_i(x) \qquad \text{Equation 3}$$

where $a_i(x)$=is a base function.

For example, $a_i(x)$ may be a base function that receives as input a portion or all of the set of features, and outputs a value. The base function may include quadratic functions of some or all the set of features.

In some embodiments, the base functions may include wavelet functions, with each wavelet function related to a mother wavelet through a process of dilation, translation, or other possible processes, the precise relationship determined by additional coefficients. In some embodiments, the base functions may include neural networks. In embodiments, the base functions themselves may depend on coefficients that have to be learned, such as a radial basis function with center $c_i$:

$$a_i(x) = \exp(-\text{dist}(x, c_i)), \qquad \text{Equation 4}$$

where dist=a distance function, and $c_i$ is vector of coefficients and is thus part of the coefficient vector w.

Figure 5:
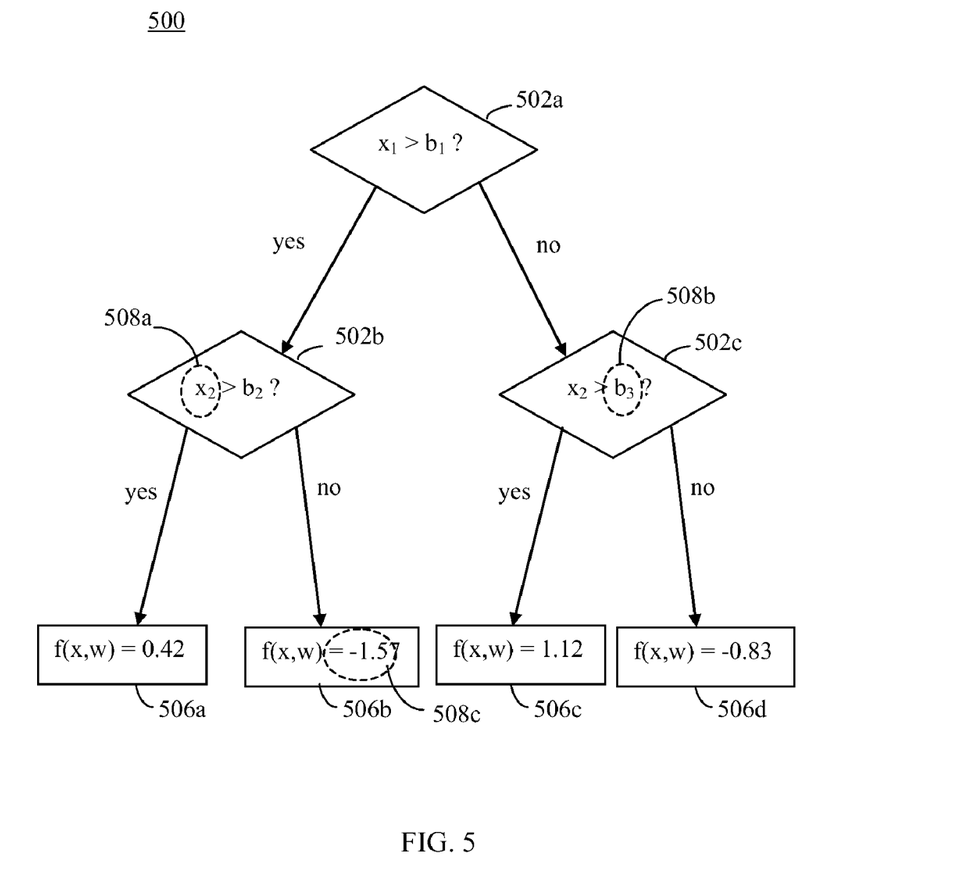
FIG. 5 shows an example of a regression tree.

In some embodiments, a base function includes a regression tree. For example, a base learner may be a regression tree 500, as depicted in FIG. 5. Referring to FIG. 5, a regression tree in block 502a examines a first "splitting variable," $x_1$, and compares its value to a "splitting location" $b_1$. For example, the splitting variable may be equal to the value of one of the features, $x_1$. In another example, the splitting variable may be a linear or nonlinear function of one or more of the features in the set of selected features. Depending on the result of the comparison performed in block 502a, the flow of tree 500 proceeds to either block 502b or block 502c. Each block 502 has an associated splitting variable and a splitting location. The splitting variables (e.g., 508a) and splitting locations (e.g., 508b) are coefficients 508 that are needed to determine the base function represented by tree 500.

Based on the comparisons made in blocks 502, the flow of tree 500 proceeds to one of the four terminal nodes 506a-506d. In each terminal node, a terminal value (e.g., 508c), is assigned as the value of the base function. The terminal values (for example, 508c) are also coefficients 508 that are needed to determine the base function represented by tree 500.

In some embodiments where the base functions are regression classification trees, the relevance function may be determined as a function of a linear combination of the terminal values returned from application of each base function to the set of selected features.

Referring to FIG. 4, in step 406, a query error is defined that measures a difference between a ranking generated by the relevance function and a training set ranking based on a query and a set of scored documents associated with the query. In embodiments, the query error is an error related to a particular relevance measure, such as a discounted cumulative gain (DCG) error. For instance, the query error may be defined as a difference between a best achievable DCG, which may be calculated according to Equation 1 shown, and an approximated version of the DCG. In other words, the query error may be expressed as follows for Equation 5:

$$\text{query error} = \text{DCGopt} - \text{DCGapprox} \qquad \text{Equation 5}$$

where

DCGopt=an optimal DCG, and

DCGapprox=an approximation of the DCG.

In an embodiment, the query error may be expressed as a continuous function of coefficients. For instance, in an embodiment of Equation 5, the query error is defined according to Equation 6 shown below, providing a difference between an optimal DCG function (the first term) and an approximation of the DCG function (second term):

$$\max_{\pi} \sum_{i \in U_q} D(\pi(i)) G(y_i) - \sum_{j=1}^{ND_q} D(j) \frac{\sum_{i \in U_q} G(y_i) h_{ij}}{\sum_{i \in U_q} h_{ij}} \qquad \text{Equation 6}$$

where

D(j)=a discount function,

NDq=a number of documents in the set of documents for the query,

Uq=the set of documents for the query,

π=a permutation from Uq to 1-NDq, $y_i$=a training relevance score for document i, $G(y_i)$=a mapping function for $y_i$, and $h_{ij}$=a continuous approximation of an indicator function where document i is ranked in a position j by the relevance function.

In an embodiment, $h_{ij}$ may be expressed as follows:

$$h_{ij} = \exp\left(-\frac{\|f(x_i, w) - f(r(j), w)\|^2}{2\sigma^2}\right), \quad \text{Equation 7}$$

where $x_i$=a feature vector containing evaluated feature information for document i of the set of documents, r(j)=the j-th document in the ranking induced by the relevance function, w=a coefficient vector containing the one or more coefficients, $f(x_i, w)$=the relevance function evaluated on document i, and σ=a smoothing length-scale parameter.

Discount function D(j) may be configured to discount documents to any degree and/or manner, as desired for a particular application. For example, in an embodiment, the discount function D(j) may be expressed as shown below in Equation 8:

$$D(j) = \frac{1}{\log_2(j+1)} \quad \text{Equation 8}$$

D(j) can also be optionally truncated at a certain rank p, such that D(j)=0 for j>p.

Training relevance rankings $y_i$ may be generated in any manner, including being assigned by human subjects 110 that are provided with the associated query and retrieved documents, as described above. Any range of values may be assigned to relevance rankings $y_i$, such as by selecting values from the set {0, 1, 2, 3, 4}, where a ranking of 0 indicates little to no relevance, and a ranking of 4 indicates extremely high relevance for the document being ranked.

Mapping function $G(y_i)$ is configured to map values of training relevance rankings $y_i$ to a second set of values. For example, in an embodiment, mapping function G(y) may be $2^y-1$.

Feature vector $x_i$ contains evaluated information for a number of features, as described above or referenced elsewhere.

Function r(j), as stated above, is a function that generates the j-th document in the ranking induced by the relevance function. In other words, if function r(j) returns $x_i$, this means that document i is assigned rank j by the relevance function.

Coefficient vector w contains a vector of the coefficients of the relevance function being determined. If the relevance function is linearly parameterized (e.g., see Equation 2), "w" is referred as a weight vector because each component (coefficient) indicates the weight (or importance) of an associated input feature x.

σ is a parameter that may be referred to as a "smoothing length-scale" or may have other descriptive name or label. σ controls the approximation of the DCG error function provided by Equation 6. For example, if σ is selected to be a relatively small value, Equation 6 approximates the DCG error relatively well, but the function of Equation 6 is less smooth (e.g., it may change rapidly). Thus, it may be relatively difficult to optimize. In contrast, if σ is selected to be a relatively large value, the function of Equation 6 is smoother, but the approximation of the DCG error by Equation 6 may be less accurate.

In step 408, an objective function that depends on the defined query error is defined. The objective function may be defined to be a sum over a set of queries of the defined query error, a weighted sum over the set of queries of the defined query error, or a regularized sum over the set of queries of the defined query error, in some example embodiments. For instance, in an embodiment, the objective function may be a sum of query errors, using the query error defined by Equation 5, over a number of queries, $n_q$, as shown below:

$$\text{sum of query errors} = \sum_{q=1}^{n_q} (DCGopt - DCGapprox) \quad \text{Equation 9}$$

where $n_q$=a number of queries.

In an embodiment, Equation 10 shown below may be used to calculate a sum of query errors based on the defined query error of Equation 6:

$$\sum_{q=1}^{n_q} \left( \max_\pi \sum_{i \in U_q} D(\pi(i))G(y_i) - \sum_{j=1}^{NDq} D(j)\frac{\sum_{i \in U_q} G(y_i)h_{ij}}{\sum_{i \in U_q} h_{ij}} \right), \quad \text{Equation 10}$$

In an embodiment, this sum may be a weighted sum as to reflect the relative importance of different queries. In a further embodiment, a regularization term can be added to the sum of query errors, as shown below as Equation 11:

$$\frac{\lambda}{2}\|w - w_0\|^2 + \sum_{q=1}^{n_q} \left( \max_\pi \sum_{i \in U_q} D(\pi(i))G(y_i) - \sum_{j=1}^{NDq} D(j)\frac{\sum_{i \in U_q} G(y_i)h_{ij}}{\sum_{i \in U_q} h_{ij}} \right), \quad \text{Equation 11}$$

where $$\frac{\lambda}{2}\|w - w_0\|^2$$

is a regularization term,

λ=a regularization parameter, and $w_0$=a weight vector of values of the coefficients as initialized.

λ is referred to as a regularization parameter. λ provides a tradeoff between overfitting (learning the data relatively very well, but not being able to generalize well to unseen examples) and underfitting (not learning the training data relatively well).

Figure 6:
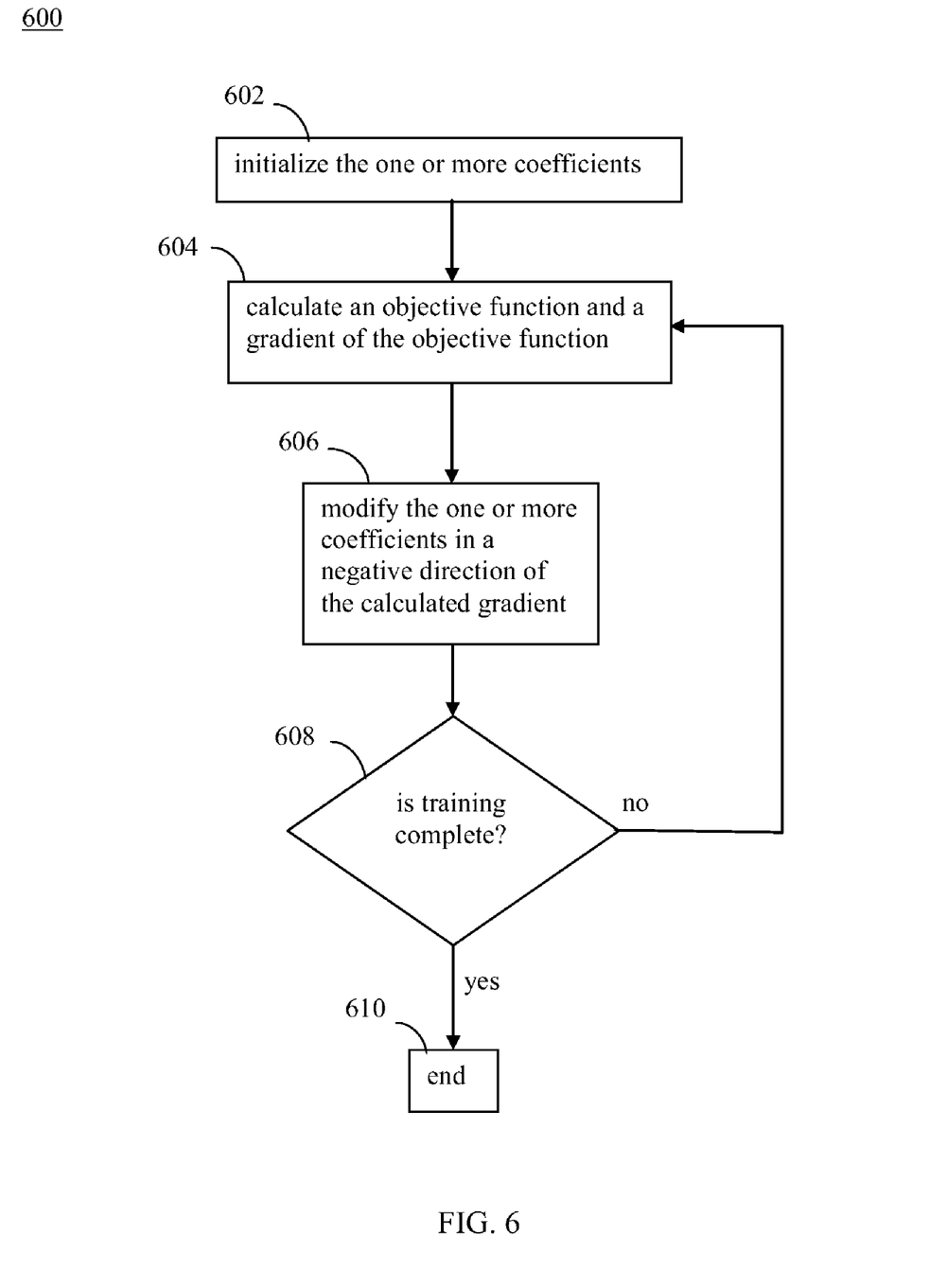
FIG. 6 shows a flowchart for determining coefficients for a relevance function, according to an example embodiment of the present invention.

$w_0$ is a weight vector of values of the coefficients as initialized, such as values of the coefficients in w initialized in step 602. $w_0$ may also be a vector whose coefficients are zero.

In step 410, values are determined for the coefficients of the relevance function that substantially minimize the defined objective function. For example, in an embodiment where the objective function is a sum over a set of queries of the defined query error, this minimization may be carried out through a gradient descent procedure (e.g., see FIG. 6, which is described in detail below). In another embodiment, a gradient boosting algorithm may be used to select the coefficients of the relevance function that minimize the total error. For example, refer to Friedman, J. H. "Greedy Function Approximation: A Gradient Boosting Machine," The Annals of Statistics 29(5), October 2001, which is hereby incorporated by reference in its entirety. GradientBoost is a technique that may be used for this purpose when the base functions are classification and regression (CART) trees. For further description of CART trees, including methods of selecting coefficients of CART trees to minimize an error, see, L. Breiman, J. H. Friedman, R. A. Olshen, and C. J. Stone, Classification and Regression Tress, Belmont, Calif.: Wadsworth, 1984, which is hereby incorporated by reference in its entirety.

FIG. 6 shows a flowchart 600 for determining values for the coefficients of the relevance function in step 410 of flowchart 400, according to an example embodiment of the present invention. Flowchart 600 determines values for the coefficients according to an example gradient descent technique. In further embodiments, techniques other than shown in FIG. 6, such as those described in the previous paragraph, may be used to determine values for the coefficients. Further structural and operational embodiments will be apparent to persons skilled in the relevant art(s) based on the discussion regarding flowchart 600. Flowchart 600 is described as follows.

Flowchart 600 begins with step 602. In step 602, the one or more coefficients is/are initialized. The weight vector w, which contains the coefficients of the relevance function, can be initialized to a random vector, or may be initialized it to vector that has already been determined (e.g., by a different optimization technique). For instance, w may be initialized to a value of $w_0$ determined by a regression solution, such as where w is selected to minimize the mean squared error, as described in U.S. Pat. No. 7,197,497 to David Cossack, which was incorporated herein by reference in its entirety further above.

In step 604, an objective function and a gradient of the objective function are calculated. The objective function defined in step 408 is calculated over the number of queries, $n_q$, with the relevance function having coefficients as initialized in step 602 (first iteration) or as modified as described below (e.g., as modified in step 606 for a subsequent iteration). It would be apparent to persons skilled in the relevant art(s) how to calculate the objective function in this manner.

Methods and systems for calculation of the gradient of the sum of the query errors (with regard to Equation 10) and/or the gradient of the regularized sum of the query errors (with regard to Equation 11) in step 604 will be well known to persons skilled in the relevant art(s), and thus for purposes of brevity, such methods and systems are not described in detail herein. When the coefficients are such that there is a tie for at least one query in the relevance function, the function is not differentiable at this particular point. In this case, an arbitrary subgradient can be used in place of the gradient. This amounts to breaking the tie arbitrarily.

In step 606, the one or more coefficients is/are modified in a negative direction of the calculated gradient. Values of the one or more coefficients may be modified by any amount, as appropriate for the particular application. In one example embodiment, the values of the coefficients may be modified through a "line search," where an approximate minimum of the function along the gradient direction is found.

In step 608, whether the training is complete is evaluated. For instance, in an embodiment, if the norm of the calculated gradient is less than a predetermined value, the training is determined to be complete. If the norm of the calculated gradient is greater than the predetermined value, the training is determined to not be complete. If the training is determined to be complete in step 608, operation proceeds to step 610. If the training is determined to not be complete in step 608, operation proceeds to step 604. In such case (training not complete), step 604 can be repeated (recalculating the sum of query errors and recalculating the gradient), and step 606 can be repeated (modifying the one or more coefficients in a negative direction of the recalculated gradient). Step 608 may then be repeated to determine whether training is complete, with steps 604 and 606 being repeated until training is determined to be complete in step 608.

In step 610, flowchart 600 is completed. In an embodiment, as shown in FIG. 4, operation may proceed to step 412 if it is desired to test the relevance function generated by steps 402-410 of flowchart 400. Alternatively, operation of flowchart 400 may be complete after completion of flowchart 600.

In step 412, the relevance function is tested. The relevance function may be tested in any manner, as would be known to persons skilled in the relevant art(s). For example, in an embodiment, training information 118 generated by human subjects 110 in FIG. 1 may be used to test the relevance function. In an embodiment, a first portion of training information 118 (e.g., a first set of queries, associated documents, and associated relevance scores) may be used to determine relevance function 116 as described above, and a second portion of training information 118 may be used to test the relevance function in step 412. For example, the second portion of training information 118 may be a holdout validation set generated by randomly selecting a set of queries/documents/relevance scores from training information 118, while the remainder of training information 118 is the first portion that is used to determine relevance function.

According to step 412, in an embodiment, the relevance function may be used to rank the documents of the one or more test queries. Any measure can be used to test the ranking produced by the relevance function. For example, in an embodiment, the average DCG of the test queries is computed.

In decision step 414, whether the relevance function performance is sufficient is evaluated. The performance of the relevance function may be evaluated in any manner, based on the results of the test of the relevance function in step 412. For example, in an embodiment, if the average DCG is above a certain threshold, the performance of the relevance function is determined to be sufficient. If the performance is determined to be sufficient in step 414, operation proceeds to step 418. If the performance is determined to not be sufficient in step 414, operation proceeds to step 416.

In step 416, at least one parameter of the defined query error is adjusted. For example, the σ parameter of Equation 7 may be adjusted. After step 416 is complete, operation proceeds to step 410. Steps 416, 410, and 412 may be repeated as many times as necessary, until the performance of the relevance function is determined to be sufficient in step 414. In an embodiment, a deterministic annealing algorithm is used and the value of a is decreased gradually from a large value to a small value.

In step 418, the relevance function is enabled. For example, relevance function 116, as generated according to flowchart 400 of FIG. 4, may be provided to search engine 106 as shown in FIG. 1, to be used to rank documents returned by search engine 106 in response to received queries.

For example, relevance function 116, as generated according to flowchart 400, may be provided to search engine 106. A user may submit a query to search engine 106. A set of documents is retrieved from database 114 by search engine 106 that are to be ranked for relevance with respect to the query. In some embodiments, only documents including one or more of the terms in the query are including in the set of documents. In other embodiments, other criteria may be used to select the set of documents. Relevance function 116 performs the ranking of the set of documents. For each document, values of the features of relevance function 116 are evaluated, as paired with the query. Relevance function 116 is used to determine a relevance value for each document as paired with the query. After the relevance value has been determined for each document in the set by relevance function 116, an ordered list of the set of documents may be produced. The ordered list may be determined so that the documents on the list are ordered in a sequence of decreasing relevance. Thus, the document that appears first on the ordered list will have the numerically greatest relevance value of all the documents in the set and the document that appears last of the ordered list will have the minimal relevance score of all the documents in the set.

Figure 7:
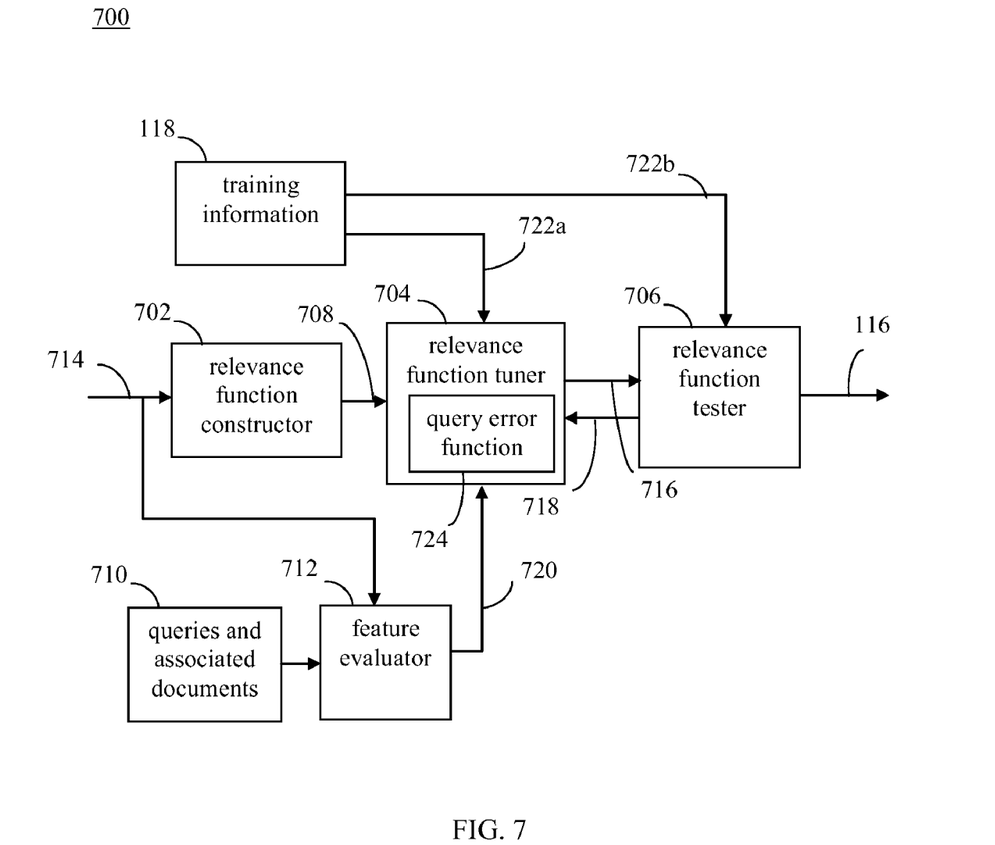
FIG. 7 shows a block diagram of a relevance function determining system, according to an example embodiment of the present invention.

In embodiments, systems may be configured in numerous ways to implement flowchart 400. For example, FIG. 7 shows a block diagram of a relevance function determining system 700, which is an example of relevance function determining system 108 shown in FIG. 1, according to an embodiment of the present invention. As shown in FIG. 7, system 700 includes a relevance function constructor 702, a relevance function tuner 704, a relevance function tester 706, and a feature evaluator 712. Relevance function constructor 702, relevance function tuner 704, relevance function tester 706, and feature evaluator 712 may be implemented in hardware, software, firmware, or any combination thereof. For example, in an embodiment, each of relevance function constructor 702, relevance function tuner 704, relevance function tester 706, and feature evaluator 712 may be implemented as code that executes in a processor. Relevance function constructor 702, relevance function tuner 704, relevance function tester 706, and feature evaluator 712 are described in detail as follows.

Relevance function constructor 702 is configured to construct a relevance function (to result in relevance function 116) based on one or more features used as predictor variables and one or more coefficients, as described above. Thus, in an embodiment, relevance function constructor 702 may perform portions or all of steps 402 and 404 of flowchart 400. For example, as shown in FIG. 7, relevance function constructor 702 receives a feature indication 714, which indicates to relevance function constructor 702 the features to be used as predictor variables in the relevance function. Relevance function constructor 702 generates a base relevance function 708 corresponding to a specified learning machine architecture (e.g., see step 404 of flowchart 400 in FIG. 4). The coefficients of base relevance function 708 are initialized to particular values (e.g., see step 602 of flowchart 600 in FIG. 6). In embodiments, relevance function constructor 702 may perform its functions with interaction by a human user (e.g., through a computer user interface), or on an automated basis.

Feature evaluator 712 is configured to receive queries and associated documents 710, which includes one or more sets of documents associated with one or more queries. Feature evaluator 712 also receives feature indication 714. Feature evaluator 712 generates a feature vector ($x_i$) 720 for each document of the received documents. Feature vector 720 includes evaluations of each of the features indicated by feature indication 714.

Relevance function tuner 704 is configured to determine values for the one or more coefficients of the relevance function to substantially minimize a defined objective function, such as an objective function of the sum of query errors defined by Equation 6 shown above. As shown in FIG. 7, relevance function tuner 704 includes a query error function 724, which may be Equation 6. Thus, in an embodiment, relevance function tuner 704 may store/utilize the query error defined in step 406, and may perform step 410 to determine values for the coefficients of base relevance function 708. As shown in FIG. 7, relevance function tuner 704 receives base relevance function 708, feature vectors 720 for each document of each query to be processed, and a first portion 722a of training information 118 having training queries, retrieved documents, and relevance scores (e.g., generated by human subjects 110). In embodiments, relevance function tuner 704 determines values for the one or more coefficients of base relevance function 708 using a gradient descent technique (e.g., according to flowchart 600 of FIG. 6), a gradient boosting procedure, or other technique described elsewhere herein or otherwise known, such as utilizing Equation 10 or Equation 11 (if a regularized sum is used).

For example, in an embodiment, relevance function tuner 704 may be configured to initialize the one or more coefficients, to calculate an objective function based on the defined query error for a plurality of queries, to calculate a gradient of the calculated objective function, and to modify the one or more coefficients in a negative direction of the calculated gradient (e.g., perform flowchart 600).

Relevance function tuner 704 generates a determined relevance function 716 formed from base relevance function 708 with coefficients having values as determined by relevance function tuner 704. Relevance function tester 706 receives determined relevance function 716. Relevance function tester 706 is configured to test determined relevance function 716. For example, in an embodiment, relevance function tester 706 may perform steps 412 and 414, as described above. In an embodiment, relevance function tester 706 may receive a second portion 722b of training information 118, having test queries, retrieved documents, and relevance scores (e.g., generated by human subjects 110). If relevance function tester 706 determines that the performance of determined relevance function 716 is not sufficient, relevance function tester 706 generates an indication 718 that is received by relevance function tuner 704. If relevance function tuner 704 receives indication 718, relevance function tuner 704 is configured to adjust one or more parameters of the defined query error. For example, relevance function tuner 704 may adjust the $\sigma$ parameter and/or $\lambda$ parameter of Equations 10 or 11 (according to step 416 of flowchart 400), depending on the particular embodiment. Relevance function tuner 704 may then re-determine values of the coefficients of the relevance function, and generate a re-determined version of relevance function 716 for test by relevance function tester 706.

If relevance function tester 706 determines that the performance of determined relevance function 716 is sufficient, relevance function tester 706 outputs relevance function 116.

Relevance function 116 may be received by search engine 106 and/or other entity for usage, as described above.

Example Computer Implementation

Figure 8:
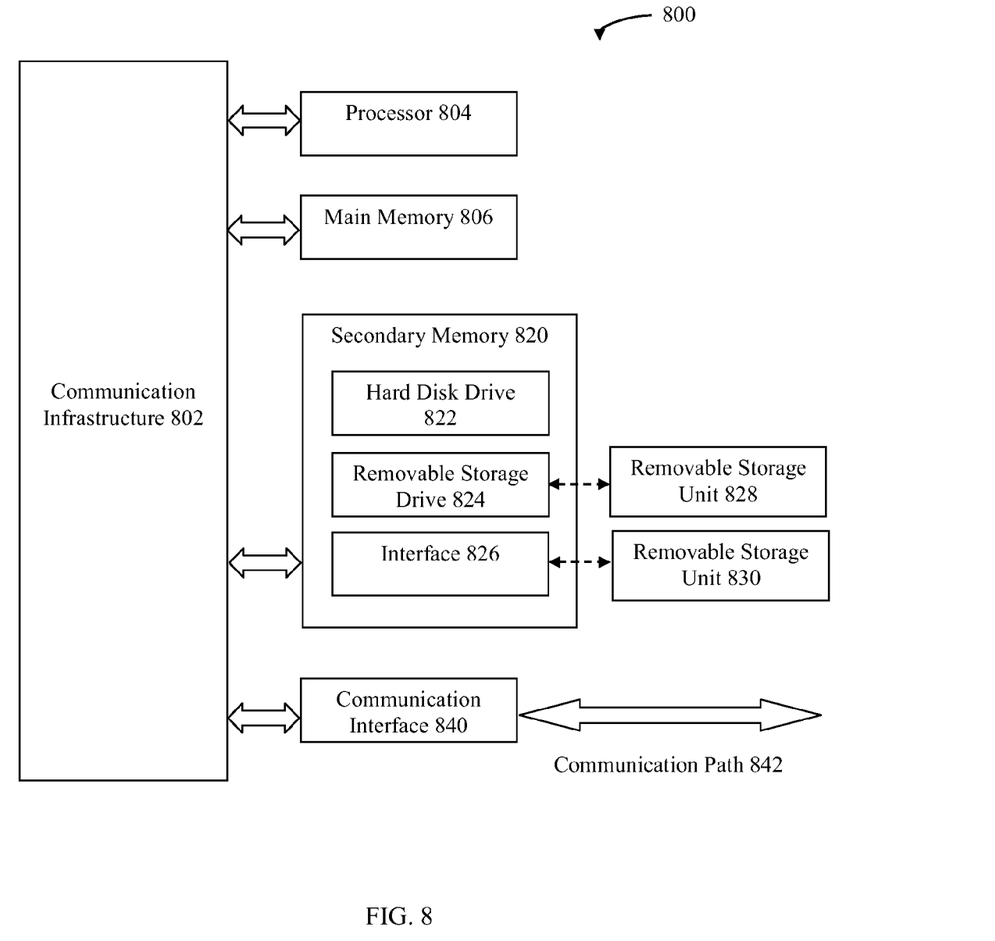
FIG. 8 shows a block diagram of an example computer system in which embodiments of the present invention may be implemented.

The embodiments described herein, including systems, methods/processes, and/or apparatuses, may be implemented using well known servers/computers, such as computer 802 shown in FIG. 8. For example, relevance function determining system 108 shown in FIG. 1 and in FIG. 7, flowchart 400 shown in FIG. 4, and flowchart 600 shown in FIG. 6, can be implemented using one or more computers 802.

Computer 802 can be any commercially available and well known computer capable of performing the functions described herein, such as computers available from International Business Machines, Apple, Sun, HP, Dell, Cray, etc.

Computer 802 includes one or more processors (also called central processing units, or CPUs), such as a processor 806. Processor 806 is connected to a communication bus 804. In some embodiments, processor 806 can simultaneously operate multiple computing threads.

Computer 802 also includes a main or primary memory 808, such as random access memory (RAM). Primary memory 808 has stored therein control logic 828A (computer software), and data.

Computer 802 also includes one or more secondary storage devices 810. Secondary storage devices 810 include, for example, a hard disk drive 812 and/or a removable storage device or drive 814, as well as other types of storage devices, such as memory cards and memory sticks. Removable storage drive 814 represents a floppy disk drive, a magnetic tape drive, a compact disk drive, an optical storage device, tape backup, etc.

Removable storage drive 814 interacts with a removable storage unit 816. Removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. Removable storage drive 814 reads from and/or writes to removable storage unit 816 in a well known manner.

Computer 802 also includes input/output/display devices 822, such as monitors, keyboards, pointing devices, etc.

Computer 802 further includes a communication or network interface 818. The network interface 818 enables the computer 802 to communicate with remote devices. For example, network interface 818 allows computer 802 to communicate over communication networks or mediums 824B (representing a form of a computer useable or readable medium), such as LANs, WANs, the Internet, etc. Network interface 818 may interface with remote sites or networks via wired or wireless connections.

Control logic 828C may be transmitted to and from computer 802 via the communication medium 824B. More particularly, computer 802 may receive and transmit carrier waves (electromagnetic signals) modulated with control logic 830 via communication medium 824B.

Any apparatus or manufacture comprising a computer useable or readable medium having control logic (software) stored therein is referred to herein as a computer program product or program storage device. This includes, but is not limited to, computer 802, main memory 808, secondary storage devices 810, removable storage unit 816 and carrier waves modulated with control logic 830. Such computer program products, having control logic stored therein that, when executed by one or more data processing devices, cause such data processing devices to operate as described herein, represent embodiments of the invention.

The invention can work with software, hardware, and/or operating system implementations other than those described herein. Any software, hardware, and operating system implementations suitable for performing the functions described herein can be used.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method of determining a relevance function, comprising:
    determining one or more features to be used as predictor variables in the construction of a relevance function using at least one processor;
    parameterizing the relevance function by one or more coefficients;
    defining a query error that measures, for a given query, a difference between a ranking generated by the relevance function and a ranking based on a training set, the defined query error being a continuous function of coefficients, wherein said defining comprises defining the query error as a difference between an optimal discounted cumulative gain (DCG) function and an approximated version of a DCG; and
    determining values for the coefficients of the relevance function that substantially minimize an objective function that depends on the defined query error.

2. The method of claim 1, wherein said defining comprises:
    defining the query error to be an approximation of a discounted cumulative gain (DCG) error.

3. The method of claim 1, wherein the objective function is a sum over a set of queries of the defined query error, wherein said determining comprises:
    determining values for the coefficients of the relevance function that substantially minimize the sum over a set of queries of the defined query error.

4. The method of claim 1, wherein said defining the query error as a difference between an optimal DCG function and an approximated version of a DCG comprises:
    defining the query error as $$\max_{\pi} \sum_{i \in U_q} D(\pi(i))G(y_i) - \sum_{j=1}^{ND_q} D(j) \frac{\sum_{i \in U_q} G(y_i) h_{ij}}{\sum_{i \in U_q} h_{ij}}$$

where
    D(j)=a discount function,
    NDq=a number of documents in the set of documents for the query,
    Uq=the set of documents for the query,
    π=a permutation from Uq to 1-NDq,
    $y_i$=a training relevance for document i, G($y_i$)=a mapping function for $y_i$, and $h_{ij}$=a continuous version of an indicator function where document i is ranked in a position j by the relevance function.

5. The method of claim 4, wherein said defining comprises:

defining $h_{ij}$ as $$h_{ij} = \exp\left(-\frac{\|f(x_i, w) - f(r(j), w)\|^2}{2\sigma^2}\right),$$

where $x_i$=a feature vector containing evaluated feature information for document i of the set of documents, r(j)=the j-th document in the ranking induced by the relevance function, w=a coefficient vector, f($x_i$, w)=the relevance function evaluated on document i, and σ=a smoothing length-scale parameter.

6. The method of claim 4, further comprising:

testing the relevance function having the determined values for the one or more coefficients.

7. The method of claim 5, further comprising:

adjusting the σ parameter and repeating said determining values for the coefficients of the relevance function that substantially minimize a sum over a set of queries of the defined query error if the relevance function does not satisfy said testing.

8. The method of claim 6, further comprising:

enabling the relevance function to be used to rank documents returned by queries if the relevance function satisfies said testing.

9. The method of claim 3, wherein said determining values for the coefficients of the relevance function that substantially minimize a sum over a set of queries of the defined query error comprises:

initializing the one or more coefficients;

calculating a sum of query errors based on the defined query error for a plurality of queries;

calculating a gradient of the calculated sum of the query errors; and modifying the one or more coefficients in a negative direction of the calculated gradient.

10. The method of claim 9, wherein if the calculated gradient is greater than a predetermined value, repeating said calculating the sum of query errors, said calculating the gradient, and said modifying the one or more coefficients in a negative direction of the calculated gradient.

11. The method of claim 9, wherein said calculating a sum of query errors based on the defined query error for a plurality of queries comprises:

calculating a regularized sum of query errors based on the defined query error for a plurality of queries.

12. The method of claim 11, wherein said calculating a regularized sum of query errors based on the defined query error for a plurality of queries comprises:

calculating the regularized sum of query errors according to $$\frac{\lambda}{2}\|w - w_0\|^2 + \sum_{q=1}^{n_q}\left(\max_\pi \sum_{i \in U_q} D(\pi(i))G(y_i) - \sum_{j=1}^{ND_q} D(j)\frac{\sum_{i \in U_q} G(y_i)h_{ij}}{\sum_{i \in U_q} h_{ij}}\right),$$

where

λ=a regularization parameter, $w_0$=a weight vector, and $n_q$=a number of queries.

13. The method of claim 3, wherein the objective function is a weighted sum over a set of queries of the defined query error, wherein said determining comprises:

determining values for the coefficients of the relevance function that substantially minimize the weighted sum over a set of queries of the defined query error.

14. A system for determining a relevance function, comprising:

at least one server that includes at least one processor;

a relevance function constructor implemented at least partially by the at least one processor that is configured to construct a relevance function based on one or more features used as predictor variables and one or more coefficients; and a relevance function tuner configured to determine values for the one or more coefficients of the relevance function to substantially minimize an objective function that depends on a query error, wherein the query error measures a difference between a ranking generated by the relevance function and a ranking based on a training set, wherein the query error is a continuous function of coefficients, wherein the query error is defined as a difference between an optimal discounted cumulative gain (DCG) function and an approximated version of a DCG.

15. The system of claim 14, wherein the query error is an approximation of a discounted cumulative gain (DCG) error.

16. The system of claim 14, wherein the objective function is a sum over a set of queries of the query error.

17. The system of claim 16, wherein the query error is $$\max_\pi \sum_{i \in U_q} D(\pi(i))G(y_i) - \sum_{j=1}^{ND_q} D(j)\frac{\sum_{i \in U_q} G(y_i)h_{ij}}{\sum_{i \in U_q} h_{ij}}$$

where

D(j)=a discount function, $ND_q$=a number of documents in the set of documents for the query, $U_q$=the set of documents for the query, π=a permutation from $U_q$ to 1-$ND_q$, $y_i$=a training relevance for document i, G($y_i$)=a mapping function for $y_i$, and $h_{ij}$=a continuous version of an indicator function where document i is ranked in a position j by the relevance function.

18. The system of claim 17, wherein $$h_{ij} = \exp\left(-\frac{\|f(x_i, w) - f(r(j), w)\|^2}{2\sigma^2}\right),$$

where
- $x_i$ = a feature vector containing evaluated feature information for document i of the set of documents,
- r(j) = the j-th document in the ranking induced by the relevance function,
- w = a coefficient vector,
- $f(x_i, w)$ = the relevance function evaluated on document i, and
- σ = a smoothing length-scale parameter.

19. The system of claim 18, further comprising:
a relevance function tester configured to test the relevance function having the values for the one or more coefficients determined by the relevance function tuner.

20. The system of claim 19, wherein the relevance function tuner is configured to adjust the σ parameter and to repeat the determination of values for the coefficients of the relevance function if the relevance function does not satisfy the test by the relevance function tester.

21. The system of claim 16, wherein the relevance function tuner is configured to initialize the one or more coefficients, to calculate a sum of query errors based on the query error for a plurality of queries, to calculate a gradient of the calculated sum of the query errors, and to modify the one or more coefficients in a negative direction of the calculated gradient.

22. The system of claim 21, wherein if the calculated gradient is greater than a predetermined value, the relevance function tuner is configured to recalculate the sum of query errors, to recalculate the gradient, and to repeat modification of the one or more coefficients in a negative direction of the recalculated gradient.

23. The system of claim 21, wherein the relevance function tuner is configured to calculate a regularized sum of query errors based on the query error for a plurality of queries to calculate the sum of query errors.

24. The system of claim 16, wherein the objective function is a weighted sum over a set of queries of the defined query error.

25. A tangible computer program product comprising a computer usable medium having computer readable program code means embodied in said medium for determining a relevance function, comprising:
a first computer readable program code means for enabling a processor to determine values for one or more coefficients of a relevance function that is based on one or more features used as predictor variables and the one or more coefficients, wherein the first computer readable program code means is configured to enable the processor to determine values for the one or more coefficients to substantially minimize a query error, wherein the query error measures a difference between a ranking generated by the relevance function and a ranking based on a training set, wherein the query error is a continuous function of coefficients, wherein the query error is defined as a difference between an optimal discounted cumulative gain (DCG) function and an approximated version of a DCG.

\* \* \* \* \*